United States Patent [19]

Chiba et al.

[11] Patent Number: 4,809,073
[45] Date of Patent: Feb. 28, 1989

[54] SOLID STATE IMAGE PICKUP WHICH HAS DETECTING ELEMENTS AND OVERFLOW DRAINS AND GATES FOR THE OVERFLOW DRAINS AS WELL AS A NUMBER OF FIRST VERTICAL SHIFT REGISTERS AND GATES AND A SECOND PLURALITY OF VERTICAL SHIFT REGISTERS

[75] Inventors: Yoshio Chiba, Kanagawa; Kenichi Aihara, Tokyo; Fumihiko Sudo, Kanagawa, all of Japan

[73] Assignee: Sony Corporation, Tokyo, Japan

[21] Appl. No.: 131,581

[22] Filed: Dec. 11, 1987

[30] Foreign Application Priority Data

Dec. 11, 1986 [JP] Japan .................... 61-295611

[51] Int. Cl.$^4$ ................................. H04N 3/14
[52] U.S. Cl. ......................... 358/213.13; 358/105; 358/213.26
[58] Field of Search ............... 358/213.13, 213.19, 358/909, 105, 213.23, 213.26

[56] References Cited

U.S. PATENT DOCUMENTS 4,603,343 7/1986 Matsumoto et al. ........... 358/213.13
4,686,572 8/1987 Takatsu ........................ 358/213.13

Primary Examiner—Jin F. Ng
Assistant Examiner—Stephen Brinich

[57] ABSTRACT

A solid state image pick-up apparatus of a CCD (charge-coupled device) type is arranged such that the charges intermittently accumulated in photo-detecting elements during one vertical period are added within a vertical shift register and then fed to a horizontal shift register. Thus, the sensitivity can be controlled by controlling the accumulation time without the moving picture felt discontinuous and the fast moving picture can be picked up without any special apparatus.

5 Claims, 3 Drawing Sheets

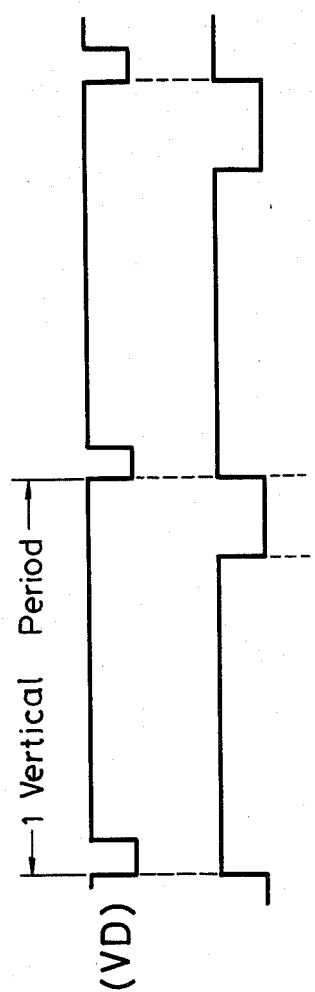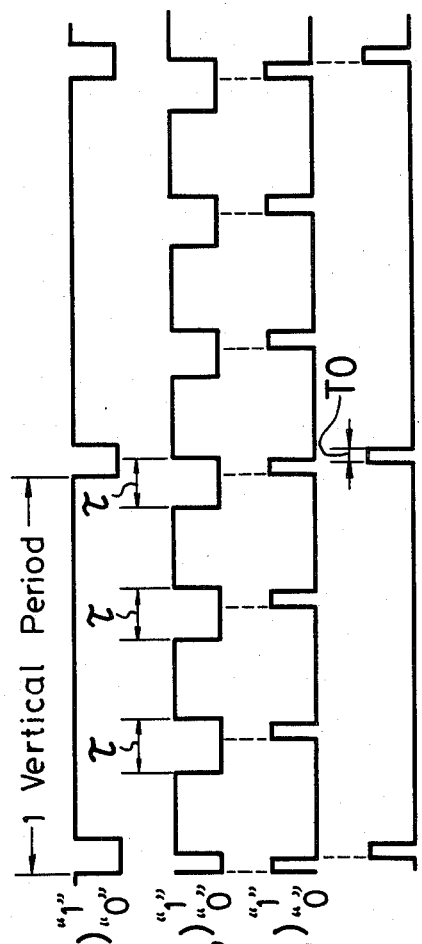
FIG. 1A (VD) (PRIOR ART)
FIG. 1B (PRIOR ART)
FIG. 3A (VD)
FIG. 3B ($P_{OG}$)
FIG. 3C ($P_{RG}$)
FIG. 3D

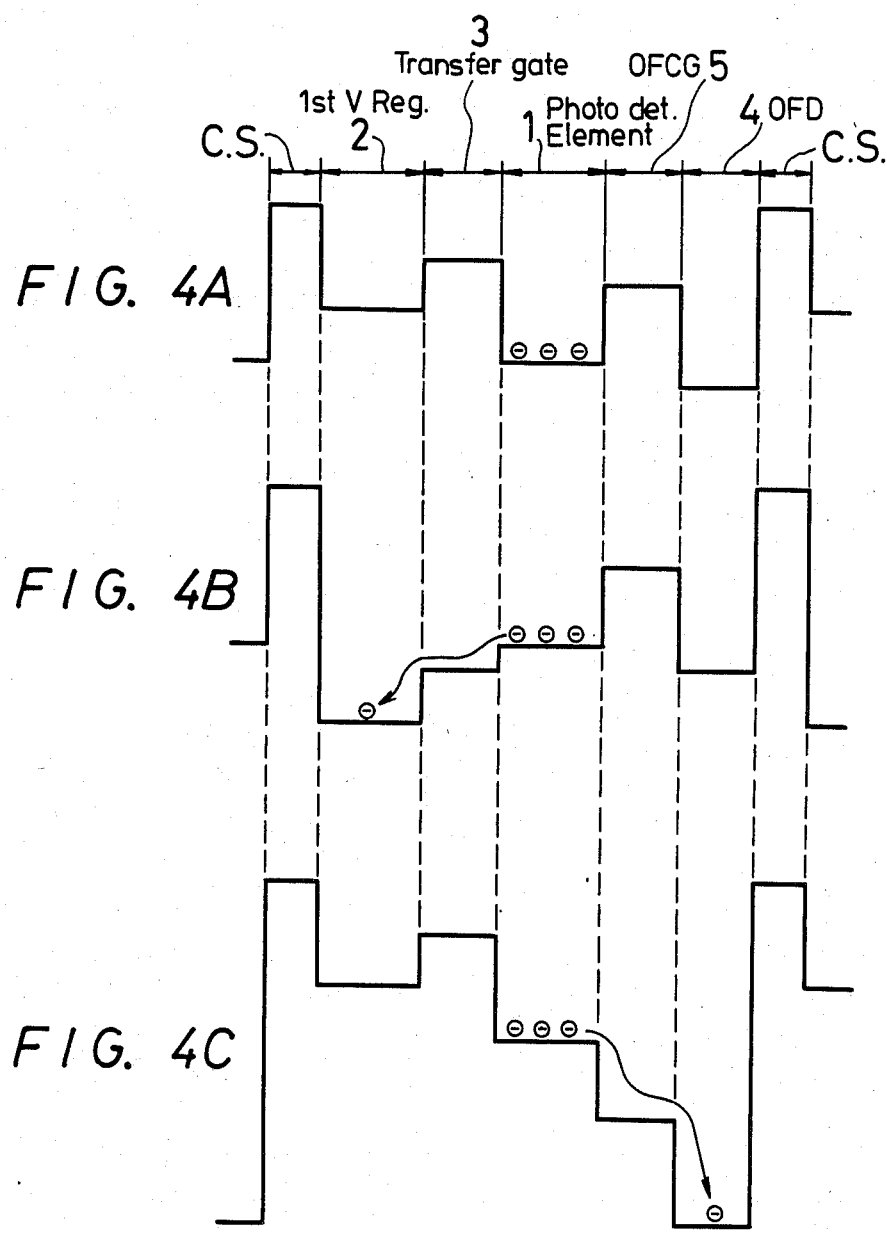

SOLID STATE IMAGE PICKUP WHICH HAS DETECTING ELEMENTS AND OVERFLOW DRAINS AND GATES FOR THE OVERFLOW DRAINS AS WELL AS A NUMBER OF FIRST VERTICAL SHIFT REGISTERS AND GATES AND A SECOND PLURALITY OF VERTICAL SHIFT REGISTERS

BACKGROUND OF THE INVENTION

1. Field of the Invention

The present invention relates generally to solid state imagers and particularly to a solid state image pick-up apparatus of a CCD (charge-coupled device) type.

2. Description of the Prior Art

So far it has been proposed to control sensitivity by controlling an accumulation time in a conventional solid state image pick-up apparatus of a CCD (charge-coupled device) type. As, for example, shown in FIG. 1B, the accumulation end time is made constant and the accumulation start time is controlled to make sensitivity control. FIG. 1A illustrates a vertical synchronizing pulse VD.

In the prior art, an accumulation time from about 1/500 to 1/2000 second is selected for a fast moving object to be picked up and analyzed in its operation and so on.

According to the solid state image pick-up apparatus of which the sensitivity is controlled by controlling the charge accumulation time as described above, if the charge accumulation time is reduced, the moving picture is felt to be discontinuous.

Further, according to the solid state image pick-up apparatus in which a short charge accumulation time is selected for a fast moving object to be picked up, the accumulation time occurs once during one vertical period and thus may fail to catch the desired object, resulting in no object image being obtained. As a method of picking up a high-speed moving object without such problem, the time of illumination from light source is controlled, but this method needs a special light source.

OBJECTS AND SUMMARY OF THE INVENTION

Accordingly, it is an object of the present invention to provide an improved solid state image pick-up apparatus of a CCD (charge-coupled device) type which can obviate the shortcomings encountered with the prior art.

It is another object of the present invention to provide a solid state image pick-up apparatus of a CCD type which can control the sensitivity without producing a discontinuous feeling in a moving picture.

It is a further object of the present invention to provide a solid state image pick-up apparatus of a CCD type which can positively pick up a fast moving object without the use of special apparatus.

According to one aspect of the present invention, there is provided a solid state image pick-up apparatus of a charge-coupled device type comprising:

(a) a plurality of photo-detecting elements arranged in a matrix;

(b) a plurality of vertical shift registers;

(c) read-out-control gate means arranged between said photo-detecting elements and said vertical shift registers;

(d) drain means for absorbing the charge generated in said photo-detecting elements without passing through said read-out-control gate means;

(e) control means for controlling the transfer of the charge from said photo-detecting elements to said drain means;

(f) a horizontal shift register supplied with the charge from said vertical shift registers and generating an output signal therefrom;

(g) first control pulse generating means for generating and supplying a first control pulse to said control means, whereby said photo-detecting elements are in a storage mode during a plurality of time durations in a vertical period and during the rest of time durations, the charge generated in said photo-detecting elements is transferred to said drain means;

(h) second control pulse generating means for generating and supplying a second control pulse to said read-out-control gate means such that said read-out-control means is turned on at the end of each said time duration whereby the charge generated in said photo-detecting elements during each said time duration is transferred to said vertical shift registers; and (i) mixing means for mixing the charges transferred to said vertical shift registers during one vertical period in said vertical shift registers whereby the mixed charges are transferred through said vertical shift registers to said horizontal shift register.

According to another aspect of the present invention, there is provided a method of controlling a solid state image pick-up apparatus of a charge-coupled device type having a plurality of photo-detecting elements arranged in a matrix, a plurality of vertical shift registers, read-out-control gate means arranged between said photo-detecting elements and said vertical shift registers, drain means for absorbing the charge generated in said photo-detecting elements, control means for controlling the transfer of the charge from said photo-detecting elements to said drain means, and a horizontal shift register supplied with the charge from said vertical shift registers and generating an output signal therefrom, said method comprising the steps of:

(a) accumulating the charges in said photo-detecting elements during a plurality of intermittent time periods in a vertical period;

(b) turning on said read-out-control gate means at the end of each said time period and transferring the charges generated in said photo-detecting elements to said vertical shift registers;

(c) mixing the charges transferred to said vertical shift registers during one vertical period in said vertical shift registers; and (d) transferring the mixed charges through said vertical shift registers to said horizontal shift register.

These and other objects, features and advantages of the present invention will become apparent from the following detailed description of the preferred embodiment to be taken in conjunction with the accompanying drawings, throughout which like reference numerals identify like elements and parts.

BRIEF DESCRIPTION OF THE DRAWINGS

FIGS. 1A and 1B are respectively timing charts used to explain the operation of a conventional solid state image pick-up apparatus;

FIGS. 3A to 3D are respectively timing charts used to explain the operation of the solid state image pick-up apparatus shown in FIG. 2; and FIGS. 4A to 4C are diagrams used to explain the present invention, respectively.

DESCRIPTION OF THE PREFERRED EMBODIMENT

Figure 2:
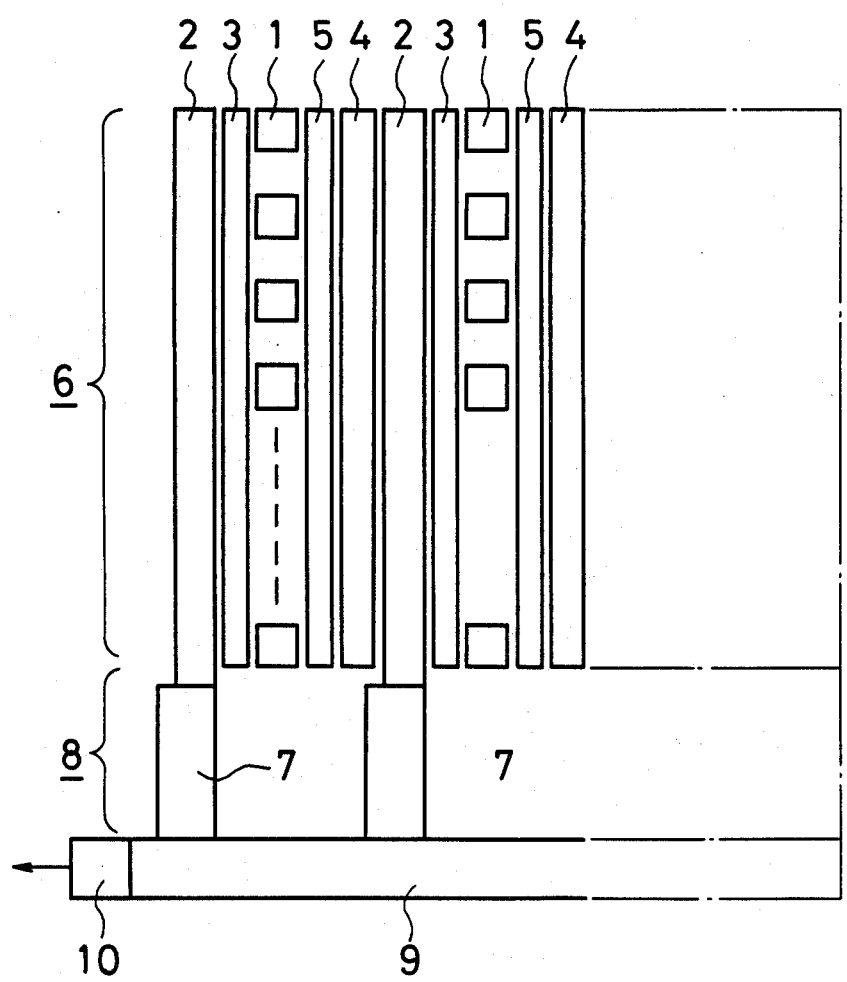
FIG. 2 is a diagram showing an embodiment of a solid state image pick-up apparatus of a CCD type according to the present invention.

Now, an embodiment of the present invention will hereinafter be described with reference to FIG. 2. In this embodiment, the present invention is applied to a CCD solid state image pick-up apparatus of the so-called frame-interline-transfer system.

Referring to FIG. 2, this solid state image pick-up apparatus includes a plurality of photo-detecting elements 1 arranged in association with respective picture elements and a plurality of first vertical shift registers 2 arranged in columns. Between the photo-detecting elements 1 arranged in column and the first vertical shift register 2, there are provided transfer gates 3 which transfer the charges accumulated in the photo-detecting elements 1 to the first vertical shift registers 2. Overflow drains 4 constitute charge absorbing portions and these drains 4 are the so-called lateral overflow structure and disposed in a position so as to oppose the photo-detecting elements 1 through overflow control gates 5. The photo-detecting elements 1, the first vertical shift registers 2, the transfer gates 3, the overflow drains 4 and the overflow control gates 5 constitute an image portion 6.

At one ends of the vertical shift registers 2 in the image portion 6, there are provided second vertical shift registers 7 which are electrically connected to the first vertical shift registers 2, respectively. The number of charge transfer stages of the second vertical shift registers 7 is equal to or more than that of the first vertical shift register 2. The second vertical shift registers 7 constitute a storage portion 8.

At the other ends of the second vertical shift registers 7 of the storage portion 8, there is provided a horizontal shift register 9 which is electrically connected to the second vertical shift registers 7. At one end of this horizontal shift register 9, there is provided a charge detecting portion 10 from which a signal is to the outside.

Although the above-mentioned structure is well known, this embodiment of the present invention is further constructed as follows.

In this embodiment, the overflow control gates 5 are supplied with a gate pulse $P_{OG}$ which becomes low level "0" three times during one vertical period as shown in FIG. 3B. FIG. 3A illustrates the vertical synchronizing pulse VD. The transfer gates 3 are supplied with a gate pulse $P_{RG}$ which becomes high level "1" each time the low level period of the gate pulse $P_{OG}$ ends as shown in FIG. 3C. In this case, as shown in FIG. 4A, a potential relation at respective portions is established when the gate pulse $P_{OG}$ is at low level "0" and the gate pulse $P_{RG}$ is at low level "0" so that charges are accumulated in the photo-detecting elements 1, respectively. Further, as shown in FIG. 4B, a potential relation is established when the gate pulse $P_{OG}$ is at low level "0" and the gate pulse $P_{RG}$ is at high level "1" so that the potential wells of the vertical shift registers 2 deepen, enabling the charges accumulated in the photo-detecting elements 1 to be transferred to the vertical shift registers 2. Furthermore, as shown in FIG. 4C, a potential relation is established when the gate pulse $P_{OG}$ is at high level "1" and the gate pulse $P_{RG}$ is at low level "0" so that the potential wells at the overflow drains 4 deepen, thus enabling the charges accumulated in the photo-detecting elements 1 to be transferred to the overflow drains 4 and be absorbed in the substrate.

In this embodiment, after the charges which have been accumulated three times in the photo-detecting elements 1 during one vertical period are respectively transferred to the first vertical shift registers 2 in response to three gate pulses $P_{RG}$, they are further transferred at high speed to the vertical shift registers 7. As, for example, as shown in FIG. 3D, such charge transfer is made during a period T0 just after the third transfer of charges from the photo-detecting elements 1 to the first vertical shift registers 2. In this case, the charge transfer is made by, for example, with either a two-phase, a three-phase or a four-phase driving system.

The charges transferred to the second vertical shift register 7 of the storage portion 8 are transferred line by line to the horizontal shift register 9 during the succeeding vertical period. Thus, the signal for a picture can be obtained from the charge detecting portion 10.

In accordance with this embodiment, since the solid state image pick-up apparatus is constructed as described above, the gate pulse $P_{OG}$ shown in FIG. 3B is supplied to the overflow control gates 5 and the charges are accumulated during the photo-detecting elements 1 only during a period in which the gate pulse $P_{OG}$ is at low level "0", the charge is intermittently accumulated three times in the photo-detecting elements 1 during one vertical period. In addition, the gate pulse $P_{RG}$ shown in FIG. 3C is supplied to the transfer gates 3 and when the gate pulse $P_{RG}$ is at a high level "1", the charges accumulated in the photo-detecting elements 1 are transferred to the first vertical shift registers 2. Also, since the gate pulse $P_{RG}$ becomes high level "1" at the end of each low level period of the gate pulse $P_{OG}$, the charges intermittently accumulated in the photo-detecting elements 1 are respectively sequentially transferred to the first vertical shift registers 2 and added together.

The added charges in the first vertical shift registers 2 are transferred to the second vertical shift registers 7 at high speed during the period T0 (see FIG. 3D) immediately after the third transfer of charge is made. The charges transferred to the second vertical shift register 7 are transferred line by line to the horizontal shift register 9 during the succeeding vertical period. Then, the signal is produced by the charge detecting portion 10.

Since during the one vertical period in which the charges which have been transferred to the second shift register 7 are being sequentially produced, the charges to be produced during the next vertical period are transferred from the photo-detecing elements 1 to the first shift registers 2 and are added together and, the charge detecting portion 10 produces the signal continuously.

By changing the period a during which the gate pulse $P_{OG}$ is at low level, it is possible to control the charge accumulation time, and hence the sensitivity.

According to this embodiment, since the charges which are intermittently accumulated three times in the photo-detecting elements 1 during one vertical period are added by the first vertical shift registers 2 and are then transferred, the moving picture will not seem to be discontinuous even if the charge accumulation time is reduced. Therefore, according to the present invention, it is possible to control the sensitivity by controlling the charge accumulation time without the picture appearing to be discontinuous. Further, according to the present invention, since the charge accumulation time occurs several times during one vertical period, it rarely occurs that the desired object cannot be picked up during the accumulation time. Thus, an object which is moving at high speed can be positively picked up without requiring any special apparatus. Therefore, the solid state image pick-up apparatus of the present invention is suitable for analyzing the action of a fast moving object.

While the charges which are intermittently accumulated there times in the photo-detecting elements 1 during one vertical period are added by the first vertical shift registers 2 and then transferred as described above, the number of charge accumulations is not limited to three but may be any desired number.

While the present invention is applied to the solid state image pick-up apparatus of the so-called frame-interline-transfer type which has a storage portion 8 as described above, the present invention can be applied to a solid state image pick-up apparatus of the interline-transfer type which has no storage portion 8. In that case, however, since the solid state image pick-up apparatus does not have a storage portion 8, the signals cannot be produced continuously, and the signal of one vertical period can be produced intermittently.

While the solid state image pick-up apparatus of lateral overflow structure is illustrated in the aforesaid embodiment, a solid state image pick-up apparatus having a vertical overflow structure can be constructed similarly. It is necessary that the charges produced by the photo-detecting elements 1 be absorbed by, for example, the substrate, not through the transfer gate 3.

According to the present invention, as set forth above, since the charges intermittently accumulated in the photo-detecting elements during one vertical period are added within the vertical shift register and then transferred to the horizontal shift register, the moving picture can be prevented from seeming to be discontinuous and the sensitivity can be controlled by controlling the charge accumulation time. Further, without any special apparatus, an object moving at high speeds can be positively picked up and hence, the present invention is suitable for analyzing the action of an object moving at high speed.

The above description is given for a single preferred embodiment of the invention but it will be apparent that many modifications and variations could be effected by one skilled in the art without departing from the spirit or scope of the novel concepts of the invention and the scope of the invention is to be determined only by the appended claims.

We claim as our invention:

1. A solid state image pick-up apparatus for a charge-coupled device type comprising:
    (a) a plurality of photo-detecting elements arranged in a matrix which generate charges;
    (b) a first plurality of vertical shift registers;
    (c) read-out-control gate means arranged between said photo-detecting elements and said first vertical shift registers;
    (d) drain means for absorbing some of said charges which are generated in said photo-detecting elements so that said some of said charges do not pass through said read-out-control gate means;
    (e) control means for controlling the transfer of some of said charges from said photo-detecting elements to said drain means;
    (f) first control pulse generating means for generating and supplying a first control pulse to said control means, whereby said photo-detecting elements are in storage mode during a plurality of time periods in a vertical period and during other time periods, said charges generated in said photo-detecting elements are transferred to said drain means;
    (g) second control pulse generating means for generating and supplying a second control pulse to said read-out-control gate means such that said read-out-control means is turned on at the end of each of said time period whereby the charges generated in said photo-detecting elements during each of said time periods are transferred to said first vertical shift registers;
    (h) mixing means for mixing said charges which are transferred to said first plurality of vertical shift registers during one vertical period further comprising a second plurality of vertical shift registers arranged to receive charges from said first plurality of vertical shift registers and a horizontal shift register which receives the output of said second plurality of shift registers, the number of said second vertical shift registers being equal to the number of said first vertical shift registers and said mixed charges in said vertical shift registers being transferred to said second vertical shift registers during a vertical blanking interval.

2. A solid state image pick-up apparatus according to claim 1, wherein said first control pulse generating means includes varying means for varying the number of pulses during a vertical period, which corresponds to the number of said time periods in a vertical period and the length of each said time duration.

3. A solid state image pick-up apparatus according to claim 1, wherein said drain means operates as an overflow drain.

4. A solid state image pick-up apparatus according to claim 3, wherein said control means is overflow control gate means and is arranged between said photo-detecting elements and said drain means.

5. A method of controlling a solid state image pick-up apparatus of a charge-coupled device type having a plurality of photo-detecting elements which generate charges arranged in a matrix, a first plurality of vertical shift registers, read-out-control gate means arranged between said photo-detecting elements and said first vertical shift registers, drain means for absorbing charges generated in said photo-detecting elements, control means for controlling the transfer of the charge from said photo-detecting elements to said drain means, a second plurality of vertical shift registers supplied with said charges from said first vertical shift registers, a horizontal shift register which receives the outputs of said plurality of shift registers and generating an output signal therefrom, said method comprising the steps of:
    (a) accumulating the charges in said photo-detecting elements during a plurality of intermittent time periods during a vertical period;
    (b) turning on said read-out-control gate means at the end of each of said time periods and transferring said charges generated in said photo-detecting elements to said first plurality of vertical shift registers;
    (c) mixing said charges which are transferred to said first plurality of vertical shift registers during one vertical period in said vertical shift registers;
    (d) transferring the mixed charges through said first plurality of vertical shift registers to said second plurality of shift registers, and
    (e) transferring said mixed charges from said second plurality of shift registers to said horizontal shift register

* * * * *